H. A. WINTERKNIGHT.
COOKING STOVE.
APPLICATION FILED DEC. 8, 1908.
944,757.
Patented Dec. 28, 1909.
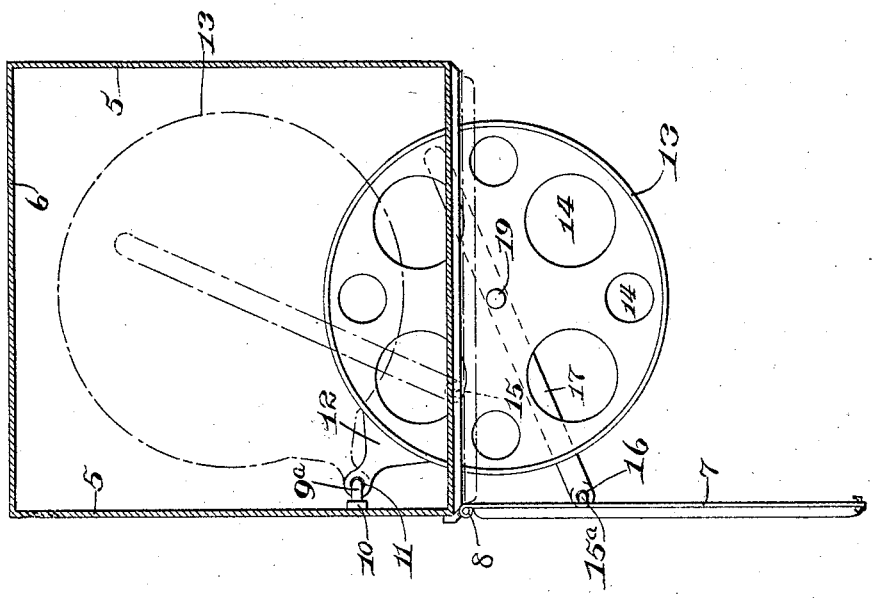
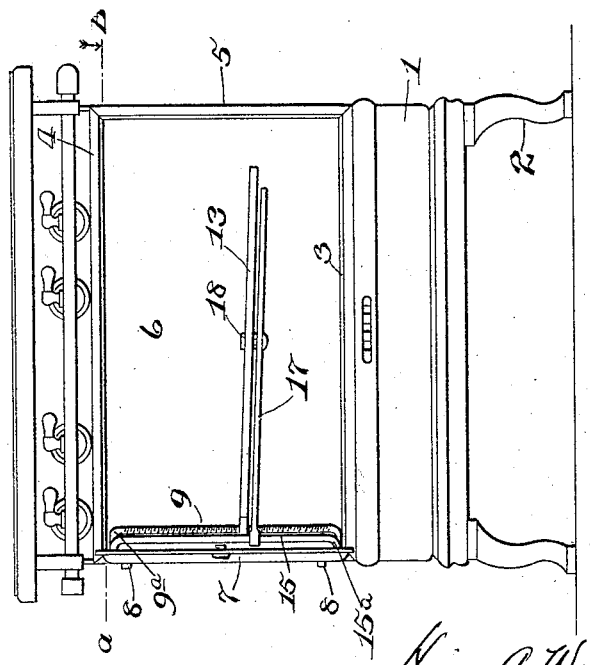
WITNESSES
INVENTOR
Henry A. Winterknight
BY
ATTORNEY

UNITED STATES PATENT OFFICE.

HENRY A. WINTERKNIGHT, OF PHILADELPHIA, PENNSYLVANIA, ASSIGNOR OF ONE-HALF TO JAMES M. CORNYN, OF PHILADELPHIA, PENNSYLVANIA.

COOKING-STOVE.

944,757.   Specification of Letters Patent.   Patented Dec. 28, 1909.

Application filed December 8, 1908. Serial No. 466,450.

*To all whom it may concern:*

Be it known that I, HENRY A. WINTERKNIGHT, citizen of the United States, residing at Philadelphia, State of Pennsylvania, have invented certain new and useful Improvements in Cooking-Stoves, of which the following is a full, clear, and exact description, reference being had to the accompanying drawings, forming a part of this specification.

My invention relates to cooking stoves of the type embodying as an element an oven with a hinged closing door, whether the heating means be devices to burn gas or oil or a fire pot to burn coal. And my invention therein has for its object to provide pivoted as well as adjustable supporting racks for the oven, automatically actuated on the opening and closing of the oven door.

To this end my invention consists of the elements, in combination, operating as stated, as hereinafter set forth, and as pointed out in the claims.

In the drawings illustrating my invention: Figure 1 is a front elevation of a gas range, embodying my improvement, the oven door being swung to open position; and Fig. 2 is a section, partly in elevation, on the line *a—b* of Fig. 1.

Referring now to said drawings, which illustrate a square form, well known, of a gas heated cooking range, the base body 1 mounted on legs 2, supporting an oven which consists of a base or floor 3, a top wall 4, opposite side walls 5, 5, rear wall 6, and a front wall in the form of a door 7 pivoted at one of its vertical edges, as at 8, to one of the side walls 5 of the oven structure. On that wall 5, of the oven, which is contiguous to and alining with the edge of the door, is mounted a vertically disposed rod 9 with its opposite ends 9ª bent and secured thereby to upper and lower brackets 10, 10, or in any suitable way, on the oven wall 5. Journaled on this rod 9 by its opening 11 is the bracket handle 12 of a disk-shaped or other suitable shaped rack 13 for supporting cooking pans. Such rack may have openings 14 instead of consisting of grill bars as commonly constructed. The rack 13 is therefore vertically adjustable on the rod 9, the opening 11 being very slightly larger in diameter than the rod, and the latter is preferably roughened, as by screw threads, as shown in Fig. 1, to provide additional friction hold.

A common defect or rather insufficiency in the fixed grill racks, within the oven, as now commonly used is that to inspect the cooking material, from time to time, the cooking pan has usually to be removed from the rack.

One object in providing my movable rack is to enable it to be swung outside the vertical plane of the front of the oven, as shown in the heavy lines in Fig. 2, the dotted lines showing it in normal position within the oven, whereby the operator can inspect the cooking material without removing the cook pan from the rack.

Another object of my improvement is to effect this swinging movement of the rack automatically through and by means of the oven door 7, so that when the door is closed the rack is in normal position within the oven, and when the door is opened the rack is swung outside the oven, as shown in Fig. 2 by the heavy lines. This is effected by the following means: Another rod 15, similar to rod 9, is vertically disposed and with its opposite bent ends 15ª secured to the door 7. Journaled on this door rod is a connecting and actuating bar shown as a flat bar 17 having an opening 16 at one end by which it embraces the rod 15, the parts being preferably constructed, as in the other case, so that the bar 17 is vertically adjustable on the rod, and yet, when it sags slightly (as shown in Fig. 1) will afford a frictional hold on the rod. The rack 13 and the actuating bar 17 are then connected in superposed position, the former over the latter, by means of a headed pin 18 passing through a slightly larger hole 19 in said bar and rack, in order that they may have a relative pivotal movement. The journal rods 9 and 15 are mounted in such relation to each other, on the oven wall and oven door respectively, that the arc of movement of the open door on its hinges, which is a full quarter circle, both in opening and closing it, in no wise affects the relative position of the rack and its actuating bar 17 during any part of such movement. Hence, if the door be opened the rack and bar will pass from the position shown in dotted lines to the position shown in heavy lines, in Fig. 2. Thus the opening and the closing of the door automatically effects, respectively, the desired pivotal swing of the oven rack within and without the oven accordingly.

The underlying and identifying features of the invention reside in a pan-supporting rack pivotally mounted on an interior side wall of the oven, whereby it may have a laterally swinging movement from a normal operative position within the oven to a position wholly or partly without the vertical plane of the front of the oven; and also the combination therewith of connecting actuating means between the hinged door and said pivoted rack, operating to automatically cause such movements of the rack on the opening and the closing of the door respectively; hence I do not wish to be limited to the precise construction and arrangement of the elements to pivot the rack, nor to a hinging of the door by one of its vertical edges rather than by one of its top or bottom edges, so far as such changes may be obvious and within the scope of my invention as described.

Having thus described my invention, I claim as new and desire to secure by Letters Patent:—

1. In a cooking stove comprising an oven having an open front and a hinged closing door therefor, and a pan-supporting rack with means substantially as described to support said rack within the oven and permit a lateral swinging movement thereof in an arc of a circle to and from normal position within the oven to a position partly projecting beyond the open front thereof, in combination with means to additionally support said rack and impart said described movements thereto, consisting of a bar journaled at one end to the door and pivoted intermediate its length beneath said swinging rack, and adapted to be actuated by the movements of the door.

2. In a cooking stove comprising an oven having a swinging door hinged to one of the walls, a vertically disposed rod mounted on the interior of a side wall of the oven, a rack plate provided with a peripheral handle journaled on said rod, and connecting means between the door and the rack plate operating to swing the rack plate on its pivotal bearing, actuated on the movement of the door.

3. In a cooking stove comprising an oven having a hinged door, of a pan-supporting rack adapted to swing laterally within the oven, means to pivotally support said rack from an interior side wall of the oven, a bar pivotally mounted by one end to the inner face of the door, and means to operatively connect the opposite end of said bar to the swinging rack.

4. In a cooking stove comprising an oven having a laterally swinging door hinged thereto, a vertically-disposed journal rod on an interior side wall of the oven, a pan-supporting rack journaled on said rod and adapted to swing laterally, a vertically-disposed journal rod 15 on the inner face of the door, an actuating bar 17 journaled by one end on said rod 15 and extending beneath the rack, and a pin 18 pivotally connecting said rack and bar.

In testimony whereof, I have hereunto affixed my signature this third day of December A. D. 1908.

HENRY A. WINTERKNIGHT.

Witnesses:
J. E. SMITHTON,
A. M. BIDDLE.